C. M. SMITH.
KNUCKLE JOINT FOR MOTOR VEHICLES.
APPLICATION FILED OCT. 15, 1914.
1,158,323.
Patented Oct. 26, 1915.
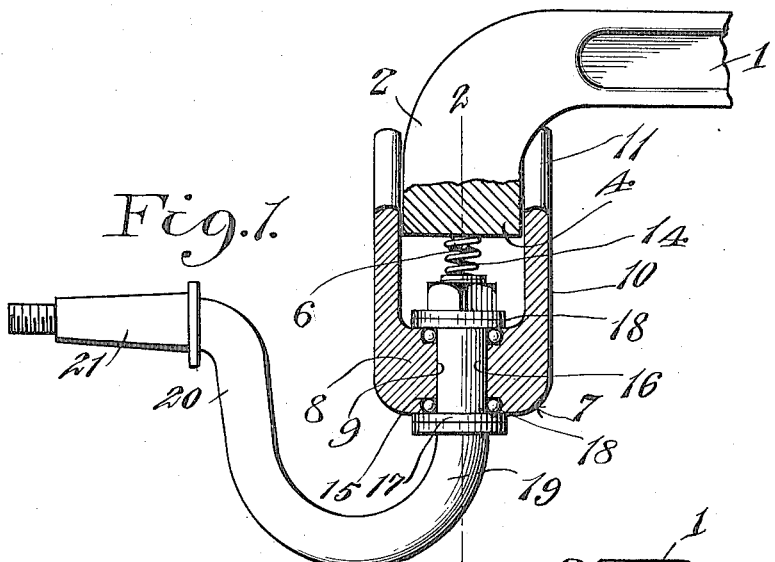
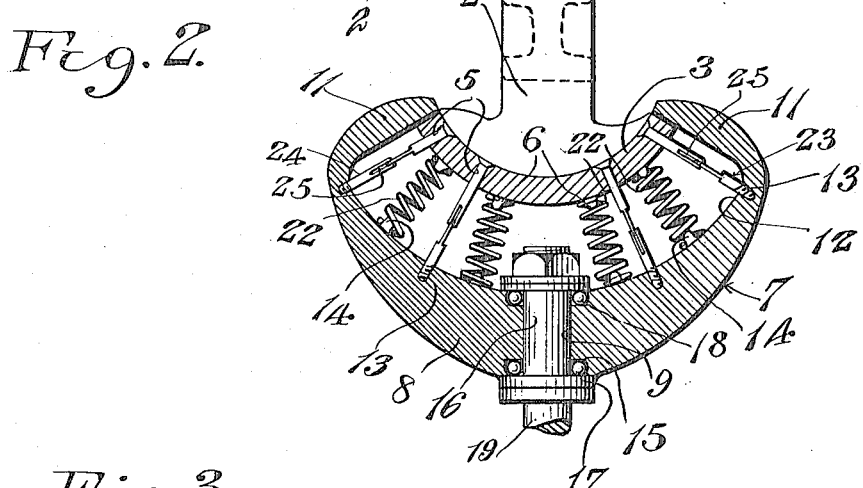
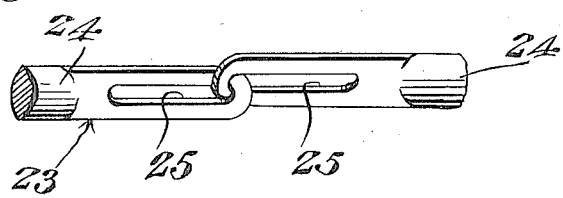
Inventor
C. M. Smith.

UNITED STATES PATENT OFFICE.

CHARLES M. SMITH, OF NEODESHA, KANSAS.

KNUCKLE-JOINT FOR MOTOR-VEHICLES.

1,158,323. Specification of Letters Patent. Patented Oct. 26, 1915.

Application filed October 15, 1914. Serial No. 866,858.

*To all whom it may concern:*

Be it known that I, CHARLES M. SMITH, a citizen of the United States, residing at Neodesha, in the county of Wilson and State of Kansas, have invented certain new and useful Improvements in Knuckle-Joints for Motor-Vehicles; and I do hereby declare the following to be a full, clear, and exact description of the invention, such as will enable others skilled in the art to which it appertains to make and use the same.

This invention relates to new and useful improvements in knuckle joints for motor vehicles, and has for its principal object to provide a joint which is resilient with relation to the axle of the vehicle.

Another object of the invention is to provide a device which will minimize the shock which is transmitted to the springs of the vehicle and absorbed thereby.

A further object of the invention is to provide a simple and efficient device which may be easily and cheaply constructed and which will effectively perform the desired function.

With these and other objects in view, the invention consists in the novel combination and arrangement of parts which will be fully set forth in the following specification and accompanying drawings, in which, Figure 1 is a vertical sectional view of a knuckle joint constructed in accordance with this invention, Fig. 2 is a vertical sectional view taken on line 2—2 of Fig. 1, and Fig. 3 is a detail view of one of the bolts.

Referring now to the drawings by characters of reference, the numeral 1 designates the vehicle axle provided at each end with the down-turned portion 2. This down-turned portion terminates in the enlarged head 3, which head is arcuate and provided with the lateral flanges 4. These flanges are provided with suitable apertures 5 which are arranged to receive the ends of the bolts as will be more fully hereinafter described. Suitable lugs 6 are formed at spaced intervals along the outer side of the head 3 and said lugs are arranged to form guides for the coil springs which coöperate in holding the two elements in spaced relation.

A suitable guide shoe designated by the numeral 7, comprises the arcuate body 8 having the central aperture 9 formed therein. This arcuate body is provided with the upwardly extending lateral flanges 10, which flanges are connected by the end walls 11 to form the recess 12 in which the head 3, hereinbefore referred to, is slidable. A plurality of internally screw-threaded recesses 13 are formed within the recess 12 and these recesses are arranged to receive the ends of the bolts which extend through the apertures 5. Suitable spaced bosses or lugs 14 are formed on the inner walls of the recess 12 and these lugs are in direct alinement with the lugs 6 hereinbefore referred to, and coöperate therewith in supporting the coil springs in place. Formed at each end of the aperture 9 in the body 8 are the annular grooves 15, the use of which will appear as the description proceeds.

Extending vertically through the aperture 9 is the cylindrical body 16, which is provided at each end with the flanges 17, which flanges coöperate with the grooves 15 and form ball races for the bearing balls 18. A suitable arcuate extension 19 is formed at the lower end of the cylindrical body 16 and this extension is curved upwardly as at 20. This arcuate extension 19 terminates in the angular projection 21 which forms the bearing upon which the wheel of the vehicle is mounted.

The springs hereinbefore mentioned for holding the two parts in their operative position, are designated by the numeral 22 and are preferably of the compression type and the outer movement of the head with relation to the member 7 is limited by means of the bolts designated generally by the numeral 23. These bolts each comprise the two separate elements 24, which are slotted as at 25 and linked together as illustrated in Fig. 3. It will thus be seen that inward movement of the several parts is permitted, but outward movement thereof is limited, thus insuring the proper location of the elements with relation to each other.

It will be apparent from the foregoing that in use should the vehicle, upon which the device is used, encounter a rough place in the road, the wheel thereof will move independently of the axle and thereby relieve the rest of the vehicle from much of the strain and thereby lengthen the life of the vehicle and render the riding qualities thereof much improved. It will be seen that the arcuate form of the head and shoe will allow the wheel to rock and the springs will take up diagonal shocks which would ordinarily be transferred to the axle. It will thus be seen that the riding qualities of a machine on which the device is used will be materially improved.

While in the foregoing there has been shown and described the preferred embodiment of this invention, it is to be understood that such changes may be made in the combination and arrangement of parts as will fall within the spirit and scope of the invention as defined in the appended claims.

What is claimed is:

1. A knuckle joint including a relatively stationary axle, a down-turned head on each end of the axle, a shoe arranged to fit the head, means to yieldably hold the head and shoe in spaced relation, and a stub axle pivoted to the shoe.

2. A knuckle joint including a relatively stationary axle, a head formed at each end of the axle, said head being down turned, a shoe arranged to receive the head, springs holding the head and shoe in spaced relation, bolts limiting the outward movement of the head and shoe, and a stub axle pivoted to the shoe.

3. A knuckle joint including a relatively stationary axle, an arcuate down-turned head formed at each end of the axle, an arcuate shoe arranged to receive the head, said shoe being apertured intermediate its ends, springs holding the head and shoe in spaced relation, bolts limiting the outward movement of the shoe and head, a cylindrical extension journaled in the shoe, and an arcuate projection on the extension, said arcuate projection terminating in a bearing.

In testimony whereof I affix my signature in presence of two witnesses.

CHARLIE M. SMITH.

Witnesses:
GEORGE WHITESIDE,
R. K. CRAIN.

Copies of this patent may be obtained for five cents each, by addressing the "Commissioner of Patents, Washington, D. C."